(12) United States Patent
Norigoe

(10) Patent No.: US 7,802,864 B2
(45) Date of Patent: Sep. 28, 2010

(54) DRIVING METHOD AND DRIVING DEVICE OF INKJET HEAD

(75) Inventor: Takashi Norigoe, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 273 days.

(21) Appl. No.: 11/869,158

(22) Filed: Oct. 9, 2007

(65) Prior Publication Data

US 2008/0088656 A1    Apr. 17, 2008

(30) Foreign Application Priority Data

Oct. 11, 2006 (JP) ............................. 2006-277950

(51) Int. Cl.
*B41J 29/38* (2006.01)
*B41J 2/045* (2006.01)

(52) U.S. Cl. ............................... 347/11; 347/14; 347/68

(58) Field of Classification Search ................... 347/11, 347/14, 68
See application file for complete search history.

(56) References Cited

U.S. PATENT DOCUMENTS

| 5,877,786 A | 3/1999 | Sekiya et al. |
| 2001/0028370 A1* | 10/2001 | Takahashi ..................... 347/10 |
| 2004/0046832 A1 | 3/2004 | Kuwahara |

FOREIGN PATENT DOCUMENTS

| EP | 06340093 | 12/1994 |
| EP | 0738598 | 10/1996 |
| EP | 10157099 | 6/1998 |
| EP | 0968823 | 1/2000 |
| JP | 09-174883 | 7/1997 |
| JP | 11-216880 | 8/1999 |
| JP | 2000-015802 | 1/2000 |
| JP | 2001-301207 | 10/2001 |
| JP | 2002-137390 | 5/2002 |
| JP | 2002-234198 | 8/2002 |
| JP | 2003-001821 | 1/2003 |
| JP | 2004-001479 | 1/2004 |

OTHER PUBLICATIONS

European Search Report for EP 07 11 8196 dated Feb. 4, 2008 corresponding to U.S. Appl. No. 11/869,158, filed Oct. 9, 2007.
Japanese Office Action dated Feb. 10, 2009 corresponding to U.S. Appl. No. 11/869,158, filed Oct. 9, 2007.

* cited by examiner

*Primary Examiner*—Matthew Luu
*Assistant Examiner*—Jannelle M Lebron
(74) *Attorney, Agent, or Firm*—Turocy & Watson, LLP

(57) ABSTRACT

An inkjet recording apparatus includes actuators provided in an inkjet head, and a drive voltage generator that drives each actuator. The drive voltage generator is configured to set the cycle time Tc, the drop cycle Td, the number of ink droplets N for a maximum tone, and the inactive period Te in a relationship of $Tc=Td \times N+Te$, set the drop cycle Td and the inactive period Te, by referencing pressure propagation time Ta in relationships of $Td=n \times Ta$ (where $n=1, 2, 3, \ldots$) and $Te=(0.5+m) \times Ta$ (where $m=1, 2, 3, \ldots$), and make an output timing of the final drive pulse signal for a dot of a tone other than the maximum tone coincide with an output timing of the final drive pulse signal for the maximum tone.

2 Claims, 3 Drawing Sheets

DRIVING METHOD AND DRIVING DEVICE OF INKJET HEAD

CROSS-REFERENCE TO RELATED APPLICATIONS

This application is based upon and claims the benefit of priority from prior Japanese Patent Application No. 2006-277950, filed Oct. 11, 2006, the entire contents of which are incorporated herein by reference.

BACKGROUND OF THE INVENTION

1. Field of the Invention

The present invention relates to a driving method and a driving device of an inkjet head that ejects one or more ink droplets to print a dot of a tone corresponding to the number of the ink droplets.

2. Description of the Related Art

An inkjet recording apparatus of a multi-drop type is conventionally known. The inkjet recording apparatus includes an inkjet head that successively ejects one or more ink droplets for printing a dot, and a drive voltage generator that drives an inkjet head. The inkjet head has a nozzle plate on which a plurality of nozzles are arranged in one direction, a plurality of pressure chambers that are communicated with the nozzles respectively at a front end, adjacent to each other, and separated by partitions, a common ink chamber that is communicated with a rear end of the pressure chambers to supply ink, and a plurality of actuators that change volumes of the pressure chambers in accordance with a waveform of a drive pulse signal supplied from the drive voltage generator as a drive voltage in a print cycle. Each of the actuators provides a pressure fluctuation to ink in the pressure chambers via deformation of a diaphragm. In this manner, the ink is ejected as one or more ink droplets from a corresponding nozzle, and a dot of a tone corresponding to the number of the ink droplets is printed on paper.

In the inkjet recording apparatus described above, after a dot is printed by continuous ejection of ink droplets, an auxiliary voltage pulse is added to the drive pulse signal so that ink droplets are not unnecessarily ejected from the nozzles (for example, refer to Jpn. Pat. Appln. Publication No. 2004-1479).

In addition, in order to prevent excess ink droplets called satellites from being ejected from the nozzles, in a case where dot information for a next print cycle is non-ejection, the drive pulse signal is output with a time delay of a predetermined period from a start timing of the print cycle (for example, refer to Jpn. Pat. Appln. Publication No. 2002-234198).

However, according to principles of these documents, there has been a problem that control becomes complicated. In addition, there has been a problem that print speed is lowered when the drive pulse signal is output with a time delay of a predetermined period from a start timing of an original print cycle as described in Jpn. Pat. Appln. Publication No. 2002-234198.

BRIEF SUMMARY OF THE INVENTION

An object of the present invention is to provide an inkjet head driving method and an inkjet head driving device capable of reducing an effect of remaining vibration that is generated in a preceding print cycle and deteriorates print quality in a subsequent print cycle, without accompanying complexity of control and reduction in print speed.

According to a first aspect of the present invention, there is provided a driving method of an inkjet head including a plurality of nozzles that eject one or more ink droplets to print a dot of a tone corresponding to the number of ink droplets, a plurality of pressure chambers that are communicated with the nozzles respectively, adjacent to each other, and separated by partitions, and a common pressure chamber that supplies ink to the pressure chambers, comprising: providing a plurality of actuators for the pressure chambers that change volumes of the pressure chambers according to drive voltages; and applying a series of drive pulse signals for the number of ink droplets to be ejected as the drive voltage to each of the actuators in each cycle time Tc which is a print cycle of one dot, wherein the cycle time Tc, a drop cycle Td in which the drive pulse signal for ejection of each ink droplet is applied, the number of ink droplets N for a maximum tone, and an inactive period Te in which the pressure chambers are made inactive from an end of application of a final drive pulse signal for the maximum tone to a start of the next cycle time Tc are set in a relationship of $Tc = Td \times N + Te$, the drop cycle Td and the inactive period Te are set, by referencing pressure propagation time Ta of a pressure wave that propagates in each of the pressure chambers from the common pressure chamber to the nozzle, in relationships of $Td = n \times Ta$ (where n (natural number)=1, 2, 3, ... ) and $Te = (0.5+m) \times Ta$ (where m (natural number)=1, 2, 3, ... ), and an output timing of the final drive pulse signal for a dot of a tone other than the maximum tone is made coincide with an output timing of the final drive pulse signal for the maximum tone.

According to a second aspect of the present invention, there is provided a driving method of an inkjet head including a plurality of nozzles that eject one or more ink droplets to print a dot of a tone corresponding to the number of ink droplets, a plurality of pressure chambers that are communicated with the nozzles respectively, adjacent to each other, and separated by partitions, and a common pressure chamber that supplies ink to the pressure chambers, comprising: providing a plurality of actuators for the pressure chambers that change volumes of the pressure chambers according to drive voltages; and applying a series of drive pulse signals for the number of ink droplets to be ejected as the drive voltage to each of the actuators in each cycle time Tc which is a print cycle of one dot, wherein in the cycle time Tc, the number of ink droplets N for a maximum tone, output time $Td_k$ (where k=1, 2, 3, ... N) in which the drive pulse signal is applied for ejection of each ink droplet, and an inactive period Te in which the pressure chambers are made inactive from an end of application of a final drive pulse signal for the maximum tone to a start of the next cycle time Tc are set in a relationship of $Tc = (Td_1 + Td_2 + Td_3 + \ldots + Td_N) + Te$, the inactive period Te is set, by referencing pressure propagation time Ta of a pressure wave that propagates in each of the pressure chambers from the common pressure chamber to the nozzle, in a relationship of $Te = (0.5+m) \times Ta$ (where m (natural number)=1, 2, 3, ... ), time $Tr_k$ (where k=1, 2, 3 ... N) from a start of the next cycle time Tc to application of an initial drive pulse signal for a tone other than the maximum tone is set in a relationship of $Tr_k = n \times Ta$ (where n (natural number)=1, 2, 3, ... ), and further, a relationship of $Tr_1 > Tr_2 > Tr_3 \ldots > Tr_{N-1}$ is established.

According to a third aspect of the present invention, there is provided a driving device of an inkjet head including a plurality of nozzles that eject one or more ink droplets to print a dot of a tone corresponding to the number of ink droplets, a plurality of pressure chambers that are communicated with the nozzles respectively, adjacent to each other, and separated by partitions, and a common pressure chamber that supplies ink to the pressure chambers, comprising: a plurality of actuators that are provided for the pressure chambers and change volumes of the pressure chambers according to drive voltages; and a drive voltage generator that applies a series of drive pulse signals for the number of ink droplets to be ejected as the drive voltage to each of the actuators in each cycle time Tc which is a print cycle of one dot, wherein the drive voltage generator is configured to set the cycle time Tc, a drop cycle Td in which the drive pulse signal for ejection of each ink droplet is applied, the number of ink droplets N for a maximum tone, and an inactive period Te in which the pressure chambers are made inactive from an end of application of a final drive pulse signal for the maximum tone to a start of the next cycle time Tc in a relationship of Tc=Td×N+Te, set the drop cycle Td and the inactive period Te, by referencing pressure propagation time Ta of a pressure wave that propagates in each of the pressure chambers from the common pressure chamber to the nozzle, in relationships of Td=n×Ta (where n (natural number)=1, 2, 3, . . . ) and Te=(0.5+m)×Ta (where m (natural number)=1, 2, 3, . . . ), and make an output timing of the final drive pulse signal for a dot of a tone other than the maximum tone coincide with an output timing of the final drive pulse signal for the maximum tone.

According to a fourth aspect of the present invention, there is provided a driving device of an inkjet head including a plurality of nozzles that eject one or more ink droplets to print a dot of a tone corresponding to the number of ink droplets, a plurality of pressure chambers that are communicated with the nozzles respectively, adjacent to each other, and separated by partitions, and a common pressure chamber that supplies ink to the pressure chambers, comprising: a plurality of actuators that are provided for the pressure chambers and change volumes of the pressure chambers according to drive voltages; and a drive voltage generator that applies a series of drive pulse signals for the number of ink droplets to be ejected as the drive voltage to each of the actuators in each cycle time Tc which is a print cycle of one dot, wherein the drive voltage generator is configured to set the cycle time Tc, the number of ink droplets N for a maximum tone, output time $Td_k$ (where k=1, 2, 3, . . . N) in which the drive pulse signal is applied for ejection of each ink droplet, and an inactive period Te in which the pressure chambers are made inactive from an end of application of a final drive pulse signal for the maximum tone to a start of the next cycle time Tc in a relationship of Tc=($Td_1$+$Td_2$+$Td_3$+ . . . +$Td_N$)+Te, set the inactive period Te, by referencing pressure propagation time Ta of a pressure wave that propagates in each of the pressure chambers from the common pressure chamber to the nozzle, in a relationship of Te=(0.5+m)×Ta (where m (natural number)=1, 2, 3, . . . ), set time $Tr_k$ (where k=1, 2, 3 . . . N) from a start of the next cycle time Tc to application of an initial drive pulse signal for a tone other than the maximum tone in a relationship of $Tr_k$=n×Ta (where n (natural number)=1, 2, 3, . . . ), and further establish a relationship of $Tr_1$>$Tr_2$>$Tr_3$> . . . >$Tr_{N-1}$.

With the present invention, an effect of the remaining vibration that is generated in a preceding print cycle and deteriorates print quality in a subsequent print cycle can be reduced, without accompanying complexity of control and reduction in print speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an inkjet recording apparatus of a multi-drop type according to a first embodiment of the present invention will be described with reference to the accompanying drawings.

First Embodiment

Figure 1:
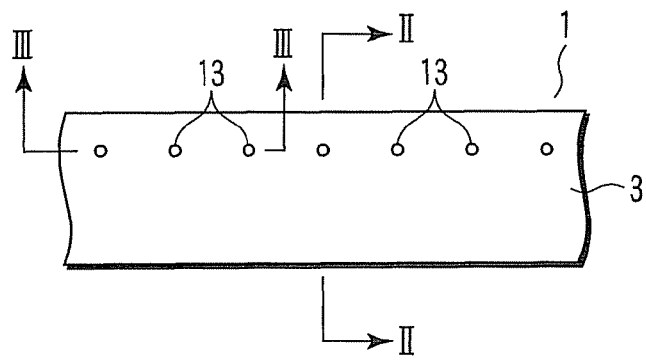
FIG. 1 is a partially enlarged view showing a front side of an inkjet head of an inkjet recording apparatus of a multi-drop type according to a first embodiment of the present invention.
Figure 2:
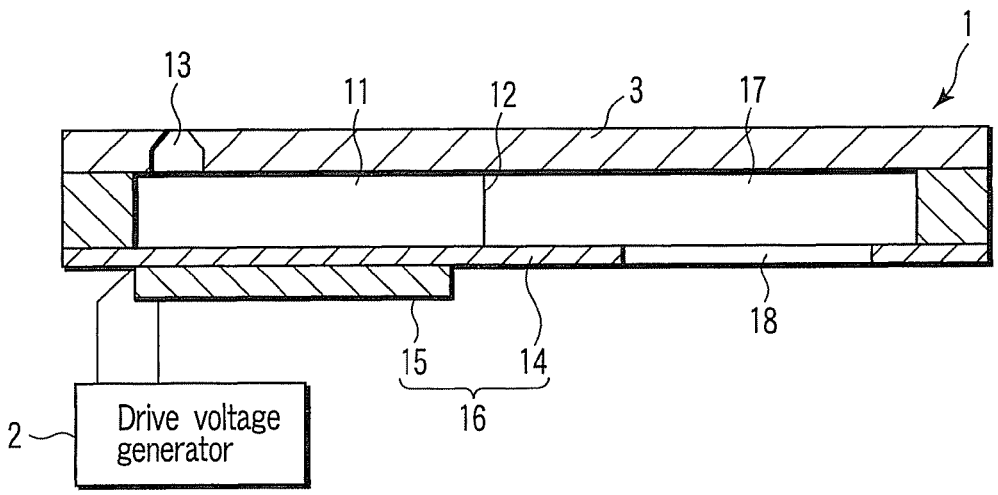
FIG. 2 is a view showing a cross-sectional structure of the inkjet head located along the line II-II shown in FIG. 1 with a drive voltage generator.
Figure 3:
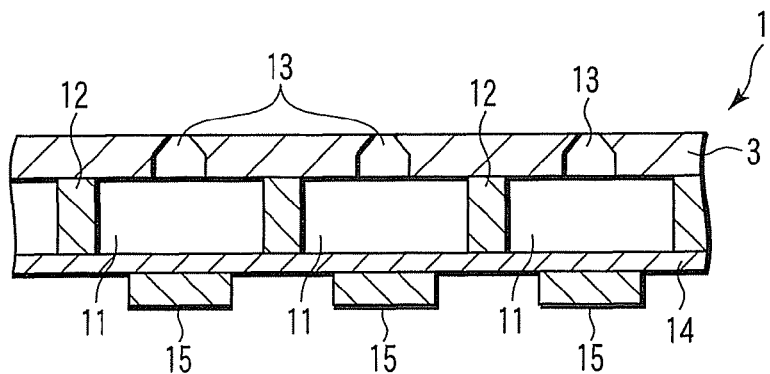
FIG. 3 is a view showing a cross-sectional structure of the inkjet head located along the line III-III shown in FIG. 1.

FIG. 1 shows an appearance of a front view of an inkjet head 1 of the inkjet recording apparatus. FIG. 2 shows a cross-sectional structure of the inkjet head 1 located along the II-II line shown in FIG. 1 together with a drive voltage generator. FIG. 3 shows a cross-sectional structure of the inkjet head 1 cut along the III-III line shown in FIG. 1. The inkjet recording apparatus includes the inkjet head 1 and a drive voltage generator 2. The inkjet head 1 includes a plurality of nozzles 13 that eject one or more ink droplets to print a dot of a tone corresponding to the number of the ink droplets, a plurality of pressure chambers 11 communicated with the nozzles 13 respectively, a common ink chamber 17 that supplies ink to the pressure chambers 11, and a plurality of actuators 16 that change volumes of the pressure chambers 11 via a diaphragm 14 by respectively according to drive voltages. The drive voltage generator 2 is provided for applying a series of drive pulse signals for the number of ink droplets to be ejected as a drive voltage to each of the actuators 16 in each cycle time Tc which is a print cycle of one dot.

In the inkjet head 1, the nozzles 13 are formed in a nozzle plate 3 and arranged as a nozzle line. The diaphragm 14 is disposed to face the nozzle plate 3. The pressure chambers 11 are adjacent to each other and separated by partitions 12 in a gap between the nozzle plate 3 and the diaphragm 14. The common ink chamber 17 is a common pressure chamber that is disposed on a rear side of the pressure chambers 11. A bottom surface of the common ink chamber 17, that is, the diaphragm 14, is provided with an ink supplying opening 18 that is connected with an external ink container. The common ink chamber 17 and the pressure chambers 11 are filled with ink that is supplied from the external ink container via the ink supplying opening 18. When the common ink chamber 17 and the pressure chambers 11 are filled with ink, a meniscus of the ink is formed at front ends of the nozzles. On a back surface of the diaphragm 14, a plurality of piezoelectric elements 15 are fixed. The piezoelectric elements 15 are located with respect to regions of the diaphragms 14 which are bottom surfaces of the pressure chambers 11, respectively. Each of the piezoelectric elements 15 provides pressure vibration to the corresponding pressure chamber 11 by deformation of the diaphragm 14 corresponding to the drive pulse signal applied from the drive voltage generator 2 via a pair of electrodes. Ink is suctioned from the common ink chamber 17 along with outward deformation of the diaphragm 14, and is ejected as ink droplets to the outside from the nozzle 13 by an ink pressure wave generated in the pressure chamber 11 along with inward deformation of the diaphragm 14.

Figure 4:
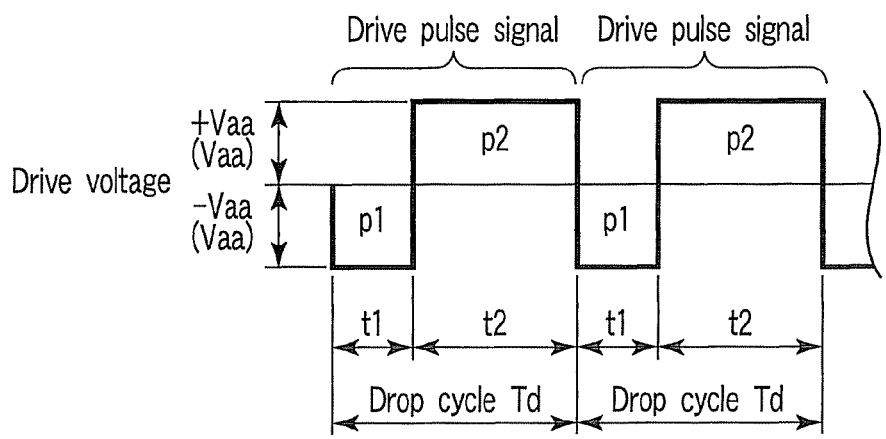
FIG. 4 is a waveform diagram showing an example of drive pulse signals output from the drive voltage generator shown in FIG. 2.

FIG. 4 shows an example of the drive pulse signals output from the drive voltage generator 2. Each drive pulse signal includes an extension pulse p1 that expands a volume of the pressure chamber 11 and a contraction pulse p2 that contracts the volume of the pressure chamber 11 after application of the expansion pulse p1. The expansion pulse p1 is a rectangular pulse that has a voltage amplitude $-V_{aa}$ and turn-on time t1. The contraction pulse p2 is a rectangular pulse that has a voltage amplitude $+V_{aa}$ and turn-on time t2. That is, the expansion pulse p1 and the contraction pulse p2 are in polarity opposite to each other with the same voltage amplitude.

In the inkjet recording apparatus, one ink droplet is ejected from the nozzle 13 every time the drive pulse signal, that is, the expansion pulse p1 and the contraction pulse p2, is applied to the actuator 16. A drop cycle Td for applying the drive pulse signal for ejection of each ink droplet is equal to time required for ejecting one ink droplet from the nozzle 13, and is Td=t1+t2. In the multi-drop type, a series of drive pulse signals are generated for the number of ink droplets to be ejected for printing a dot.

With pressure propagation time Ta of an ink pressure wave propagating in the pressure chamber toward the nozzle 13 located at a front end of the pressure chamber 11 from the common ink chamber 17 located at a rear end of the pressure chamber 11 as a reference, the turn-on time t1 of the expansion pulse p1 is set at a value substantially equal to the pressure propagation time Ta, and the turn-on time t2 of the contraction pulse p2 is set at a value substantially twice the pressure propagation time Ta. Therefore, a relationship of Td=3×Ta is established. In general, the drop cycle Td only needs to be in a relationship of Td=n×Ta (where n (natural number)=1, 2, 3, . . . ).

By setting the drop cycle Td as described above, ejection of ink droplets from the nozzle 13 is smoothly carried out.

When a voltage $-V_{aa}$ of the expansion pulse p1 is applied between the electrodes of the piezoelectric element 15, the piezoelectric element 15 deforms so as to expand the volume of the pressure chamber 11 rapidly, and negative pressure is instantaneously generated in the pressure chamber 11. This pressure is inverted to positive pressure when the pressure propagation time Ta elapses.

Next, when a voltage $+V_{aa}$ of the contraction pulse p2 is applied between the electrodes of the piezoelectric element 15, the piezoelectric element 15 rapidly deforms this time so as to contract from a state where the volume of the pressure chamber 11 is expanded, and positive pressure is instantaneously generated in the pressure chamber 11. A phase of a pressure wave generated by the pressure matches with a phase of a pressure wave generated by the first expansion pulse p1, and therefore an amplitude of the pressure wave is rapidly increased. At this time, an ink droplet is ejected from the nozzle 13.

When time 2Ta that is twice the pressure propagation time Ta elapses, pressure in the pressure chamber 11 changes in an order of positive, negative, and positive from the time when the contraction pulse p2 is applied. By resetting a voltage to zero between the electrodes of the piezoelectric element 15 when the time 2Ta elapses, the contracted volume in the pressure chamber 11 rapidly returns to the original state. In this manner, pressure in the pressure chamber 11 instantaneously decreases, and therefore the amplitude of the pressure wave is weakened and a remaining pressure amplitude becomes small.

At this time, when the expansion pulse p1 for a second ink droplet is applied between the electrodes of the piezoelectric element 15 subsequently, the volume of the pressure chamber 11 is rapidly expanded again, and negative pressure is again instantaneously generated in the pressure chamber 11.

Further, when the contraction pulse p2 of the second ink droplet is applied between the electrodes of the piezoelectric element 15, the volume of the pressure chamber 11 is rapidly contracted again, and positive pressure is again instantaneously generated in the pressure chamber 11. A phase of a pressure wave generated by the pressure matches with a phase of a pressure wave generated by the first expansion pulse p1, and therefore an amplitude of the pressure wave is rapidly increased. At this time, the second ink droplet is ejected from the nozzle 13.

Thereafter, ink droplets are successively ejected from the nozzle 13 for the number of the drive pulse signals along with pressure changes sequentially at similar timings, and a dot is formed on paper (recording medium). In this manner, a dot of a tone corresponding to the number of ink droplets is printed.

Figure 5:
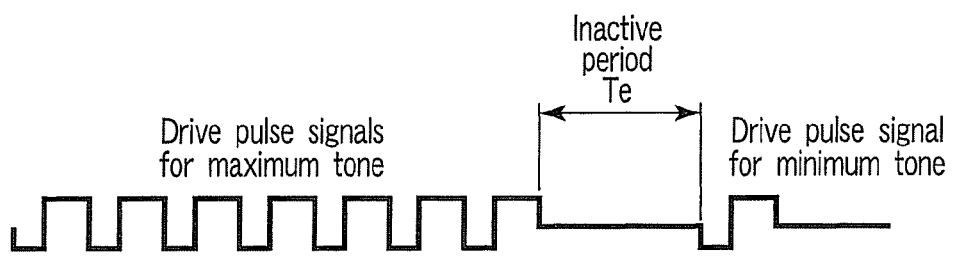
FIG. 5 is a view for explaining a relationship between remaining vibration and an inactive period obtained when a dot of a maximum tone and a dot of a minimum tone are sequentially printed by using the inkjet head shown in FIGS. 1 to 3.

There is a case where a dot of a minimum tone is printed with one ink droplet after a dot set of a maximum tone which is, for example, a seventh tone, is printed. In this case, the drive pulse signals are generated as shown in FIG. 5, for example. That is, the drive pulse signal that ejects one ink droplet for a dot of the minimum tone is generated upon elapse of the inactive period Te after successive generation of the drive pulse signals that eject a first to the seventh ink droplets. A remaining vibration generated by printing of a dot of the maximum tone affects ejection of one ink droplet that prints a dot of the minimum tone next. In general, the larger the number of preceding ink droplets is, the larger the remaining vibration becomes, and in addition, an effect of the remaining vibration becomes smaller as the number of subsequent ink droplets becomes large. Therefore, in a case where a dot of the minimum tone which includes the smallest number of ink droplets (one ink droplet) is printed after a dot of the maximum tone which is the largest number of ink droplets (seven ink droplets), an effect of the remaining vibration becomes the largest.

The remaining vibration depends on length of the inactive period Te between an end of the driving pulse signal that ejects the seventh ink droplet for a dot of the maximum tone and a start of the driving pulse signal that ejects one ink droplet for a dot of the minimum tone. That is, a degree of the remaining vibration fluctuates depending on a difference in the length of the inactive period Te, and ejection speed of an ink droplet for a dot of the minimum tone cannot be kept constant.

Figure 6:
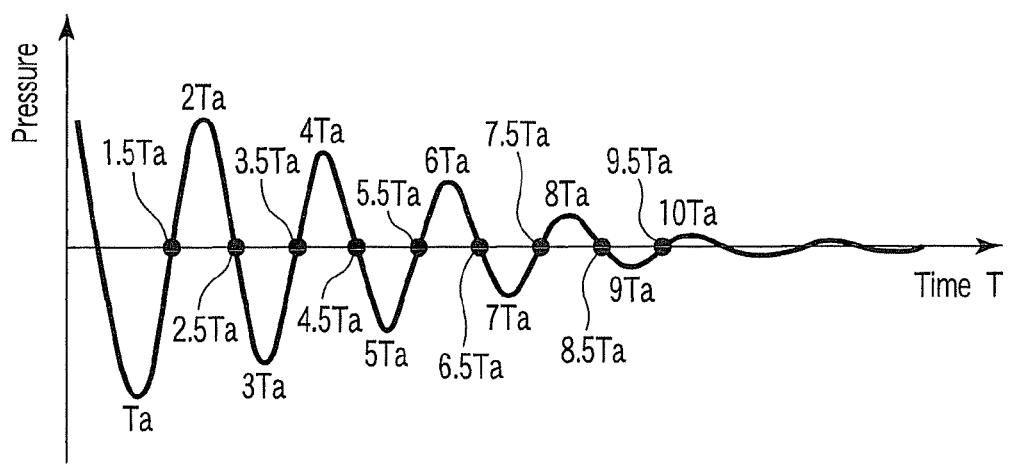
FIG. 6 is a waveform diagram showing a change of a remaining vibration wave obtained by the elapse of time after printing of a dot of the maximum tone using the inkjet head shown in FIGS. 1 to 3.

FIG. 6 shows a change of a remaining vibration wave obtained by the elapse of time after a dot of the maximum tone is printed. When a final ink droplet for the maximum tone is ejected from the nozzle 13, the remaining vibration wave in the pressure chamber 11 thereafter changes as shown in FIG. 6. The remaining vibration of the pressure is repeated in a cycle of twice the pressure propagation time Ta, and diminishes as time elapses. In this state, if the drive pulse signal for the minimum tone is generated, the ejection speed of the ink droplet changes due to the remaining vibration.

As a measure to prevent the above, it is considered that the next drive pulse signal for the minimum tone is provided after elapse of the inactive period Te which is set to be long enough to attain a state that the remaining vibration is substantially zero. In this way, a next dot of the minimum tone can be printed without being affected by the remaining vibration. However, extension of the inactive period Te requires an increase in cycle time necessary for printing of each dot, and this leads to decrease in a drive frequency of the head 1, that is, the print speed.

In order to eliminate the effect of the remaining vibration without extending the inactive period Te, timings of 1.5Ta, 2.5Ta, 3.5Ta, . . . where an amplitude of the remaining vibration waveform becomes zero in FIG. 6 are used, and the drive pulse signal for the minimum tone is generated in any of these timings. For this reason, the inactive period Te is set at Te=(0.5+m)×Ta (where, m (natural number)=1, 2, 3, . . . ). However, in order to assure sufficient print speed by increasing the drive frequency, it is preferable that $m \leq 10$ is established.

If the inactive period Te is shortened with m limited within a range of 2 to 4, the sufficient print speed can be assured. However, the shortening of the inactive period Te may also be a reason that the effect of the remaining vibration cannot certainly be eliminated.

Figure 7:
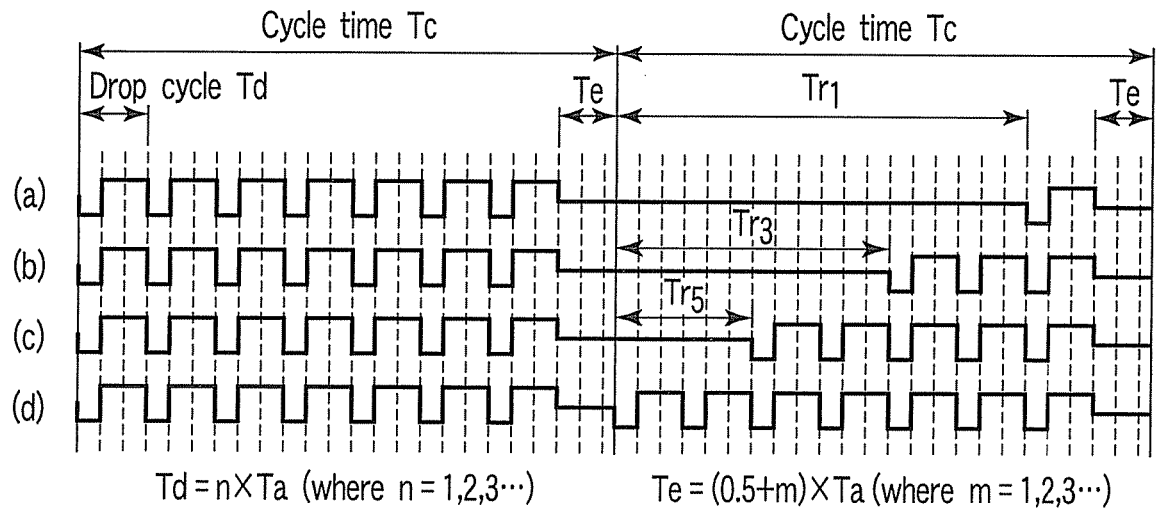
FIG. 7 is a waveform diagram showing a relationship between the drive pulse signals output for mutually different tones from the drive voltage generator shown in FIG. 2.

In view of the above, the drive voltage generator 2 performs an operation of outputting the drive pulse signals as shown in FIG. 7 with respect to the piezoelectric element 15 of each of the actuators 16. That is, a drop cycle Td of the drive pulse signals is equal with respect to all tones from a first tone to the seventh tone which is the maximum tone. Cycle time (inverse of the drive frequency) Tc which is a print cycle of a dot depends on the number of ink droplets N for the maximum tone, and is determined to be Tc=Td×N+Te. The cycle time Tc becomes Tc=7Td+Te when N=7.

In addition, all the drive pulse signals from the drive pulse signal for the first tone to the drive pulse signals for the maximum tone are generated to have final drive pulse signals which are set at the same timing in every cycle time Tc. That is, output timings of the final drive pulse signals for tones other than the maximum tone coincide with an output timing of the final drive pulse signal for the maximum tone.

In a case where a dot of the maximum tone is printed in the preceding cycle time Tc, and a dot of the minimum tone is printed in the subsequent cycle time Tc, the drive pulse signal for the minimum tone is output after the preceding cycle time Tc ends and time $Tr_1$ (=6×Td) elapses, as shown in (a) of FIG. 7.

That is, ejection of an ink droplet by the drive pulse signal is not carried out until the time $Tr_1$ elapses after a start of the subsequent cycle time Tc. Therefore, even if the remaining vibration generated in the preceding cycle time Tc remains due to the shortening of the inactive period Te, the remaining vibration is sufficiently diminished before the drive pulse signal for the minimum tone is generated in the subsequent cycle time Tc. Therefore, a dot of the minimum tone can be printed without being affected by the remaining vibration.

In addition, in a case where a dot of the maximum tone is printed in the preceding cycle time Tc, and a dot of a third tone is printed in the subsequent cycle time Tc, an initial drive pulse signal for the third tone is output after the preceding cycle time Tc ends and time $Tr_3$ (=4×Td) elapses, as shown in (b) of FIG. 7.

That is, ejection of ink droplets by the drive pulse signals is not carried out until the time $Tr_3$ elapses after start of the subsequent cycle time Tc. Therefore, even if the remaining vibration generated in the preceding cycle time Tc remains due to the shortening of the inactive period Te, the remaining vibration is sufficiently diminished before the drive pulse signals for the third tone are generated in the subsequent cycle time Tc. Therefore, a dot of the third tone can be printed without being affected by the remaining vibration.

In addition, in a case where a dot of the maximum tone is printed in the preceding cycle time Tc, and a dot of a fifth tone is printed in the subsequent cycle time Tc, an initial drive pulse signal for the fifth tone is output after the preceding cycle time Tc ends and time $Tr_5$ (=2×Td) elapses, as shown in (c) of FIG. 7.

That is, ejection of ink droplets by the drive pulse signals is not carried out until the time $Tr_5$ elapses after a start of the subsequent cycle time Tc. Therefore, even if the remaining vibration generated in the preceding cycle time Tc remains due to the shortening of the inactive period Te, the remaining vibration is diminished also in the time $Tr_5$ (=2×Td) before the drive pulse signals for the fifth tone are generated in the subsequent cycle time Tc. Further, the drop cycle Td is set at Td=n×Ta, a substantially inactive state continues for time of Te+$Tr_5$ (=0.5+m+2n)×Ta (m, n (natural number)=1, 2, 3, . . . ), and the initial drive pulse signal in the subsequent cycle time Tc is output in any of timings of 3.5Ta, 4.5Ta, . . . where an amplitude of the remaining vibration waveform becomes zero. For this reason, even if the remaining vibration is not completely diminished, a dot of the fifth tone can be printed without being affected by the remaining vibration as much as possible.

In addition, in a case that a dot of the maximum tone is printed in the preceding cycle time Tc, and a dot of the maximum tone is also printed in the subsequent cycle time Tc, the initial drive pulse signal for the maximum tone is output immediately after the preceding cycle time Tc ends, as shown in (d) of FIG. 7. At this time, time that can be used for diminishing the remaining vibration generated in the preceding cycle time Tc is only the inactive period Te and is the shortest. However, the inactive period Te is set at (0.5+m)×Ta, therefore the effect of the remaining vibration can be restricted as much as possible.

Further, a dot of the maximum tone is printed by seven ink droplets ejected successively in the subsequent cycle time Tc, therefore, even if ejection of a first ink droplet is affected by the remaining vibration, turbulence of an ink droplet ejected first can be compensated by ink droplets ejected at a second time and subsequent times. Therefore, even in this case, a dot of the maximum tone can be printed without being affected by the substantial remaining vibration.

As described above, in the present embodiment, the inactive period Te is set at (0.5+m)×Ta, and the final drive pulse signals for all the tones are output at the same timing. In this manner, the output timings of the initial drive pulse signals for the tones other than the maximum tone are delayed for time $Tr_1$ to $Tr_6$ from start of each of the cycle time Tc. In addition, $Tr_1$ to $Tr_6$ are set at integral multiples of the pressure propagation time Ta. Therefore, the initial drive pulse signal in the subsequent cycle time Tc is output at a timing where an amplitude of the remaining vibration waveform becomes zero. Further, as the number of the subsequent ink droplets becomes large, that is, as it is the tone in which a larger dot is printed, the effect of the remaining vibration generated in the preceding cycle time Tc becomes less and is set to be shorter in an order of $Tr_1 > Tr_2 > \ldots > Tr_6$. For this reason, the effect of the remaining vibration that is generated in the preceding print cycle and deteriorates print quality in the subsequent print cycle can be reduced without accompanying complexity of control and reduction in print speed.

Second Embodiment

In an inkjet recording apparatus of the present embodiment, the inkjet head 1 has the identical configuration as the first embodiment. The drive voltage generator 2 is configured to apply the drive pulse signals different from those in the first embodiment to the piezoelectric element 15 of each of the actuators 16.

Figure 8:
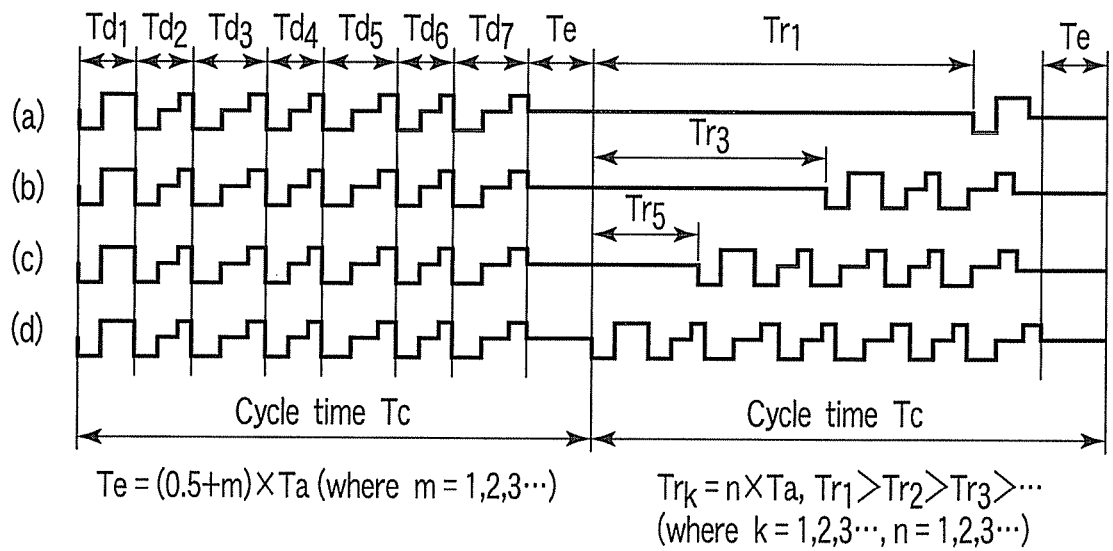
FIG. 8 is a waveform diagram showing a relationship between the drive pulse signals output for mutually different tones from the drive voltage generator in the inkjet recording apparatus according to a second embodiment of the present invention.

The drive voltage generator 2 generates the drive pulse signals of the number corresponding to the tones of a dot to be printed, where the drive pulse signals are set at output time $Td_k$ (where k (natural number)=1, 2, 3, ... N (N is the number of ink droplets for the maximum tone)). For example, the output times $Td_1$, $Td_2$, $Td_3$, $Td_4$, $Td_5$, $Td_6$, and $Td_7$ of the drive pulse signals for the maximum tone differ from each other as shown in FIG. 8. The inactive period Te is set at Te=(0.5+m)×Ta (where m (natural number)=1, 2, 3, ... ) as similar to the first embodiment. Here, it is preferable that m≦10 is established.

The cycle time (inverse of the drive frequency) Tc is determined based on the number of ink droplets N for the maximum tone so that a dot of the maximum tone can be printed as similar to the first embodiment. However, since the output time $Td_k$ differs from the drop cycle time Td, the cycle time Tc is determined to be Tc=($Td_1+Td_2+Td_3+\ldots+Td_N$)+Te. If the number of ink droplets N for the maximum tone is set at N=7, Tc=($Td_1+Td_2+Td_3+Td_4+Td_5+Td_6+Td_7$)+Te is established.

In addition, in a case where a dot of the maximum tone is printed in the preceding cycle time Tc, and a dot of a tone other than the maximum tone is printed in the subsequent cycle time Tc, the initial drive pulse signal for the tone other than the maximum tone is output after the preceding cycle time Tc ends and time $Tr_k$ that varies with the tone elapses. Here, the time $Tr_k$ is $Tr_k$=n×Ta (where n (natural number)=1, 2, 3, ... ) and a relationship of $Tr_1 > Tr_2 > Tr_3 > \ldots > Tr_{N-1}$ is established.

In a case of N=7, when a dot of the maximum tone is printed in the preceding cycle time Tc and a dot of the minimum tone is printed in the subsequent cycle time Tc, the drive pulse signal for the minimum tone is output after the preceding cycle time Tc ends and the time $Tr_1$ elapses, as shown in (a) of FIG. 8.

That is, ejection of an ink droplet by the drive pulse signal is not carried out until the time $Tr_1$ elapses after start of the subsequent cycle time Tc. Therefore, even if the remaining vibration generated in the preceding cycle time Tc remains due to the shortening of the inactive period Te, the remaining vibration is diminished sufficiently before generation of the drive pulse signal for the minimum tone in the subsequent cycle time Tc. Therefore, a dot of the minimum tone can be printed without being affected by the remaining vibration.

In addition, in a case where a dot of the maximum tone is printed in the preceding cycle time Tc and a dot of the third tone is printed in the subsequent cycle time Tc, the initial drive pulse signal for the third tone is output after the preceding cycle time Tc ends and the time $Tr_3$ elapses, as shown in (b) of FIG. 8.

That is, ejection of ink droplets by the drive pulse signals is not carried out until the time $Tr_3$ elapses after start of the subsequent cycle time Tc. Therefore, even if the remaining vibration generated in the preceding cycle time Tc remains due to the shortening of the inactive period Te, the remaining vibration is sufficiently diminished before generation of the drive pulse signals for the third tone in the subsequent cycle time Tc. Therefore, a dot of the third tone can be printed without being affected by the remaining vibration.

In addition, in a case where a dot of the maximum tone is printed in the preceding cycle time Tc and a dot of the fifth tone is printed in the subsequent cycle time Tc, the initial drive pulse signal for the fifth tone is output after the preceding cycle time Tc ends and the time $Tr_5$ elapses as shown in (c) of FIG. 8.

That is, ejection of ink droplets by the drive pulse signals is not carried out until the time $Tr_5$ elapses after a start of the subsequent cycle time Tc. Therefore, even if the remaining vibration generated in the preceding cycle time Tc remains due to the shortening of the inactive period Te, the remaining vibration is diminished also in the time $Tr_5$ before generation of the drive pulse signals for the fifth tone in the subsequent cycle time Tc. Further, $Tr_5$=n×Ta is set, a substantially inactive state continues for time of Te+$Tr_5$=(0.5+m+n)×Ta (m, n (natural number)=1, 2, 3, ... ), and the initial drive pulse signal of the subsequent cycle time Tc is output at any of timings of 2.5Ta, 3.5Ta ... where an amplitude of the remaining vibration waveform becomes zero. For this reason, even if the remaining vibration is not diminished completely, a dot of the fifth tone can be printed without being affected by the remaining vibration as much as possible.

In addition, in a case that a dot of the maximum tone is printed in the preceding cycle time Tc, and a dot of the maximum tone is also printed in the subsequent cycle time Tc, the initial drive pulse signal for the maximum tone is output immediately after the preceding cycle time Tc ends as shown in (d) of FIG. 8. At this time, time that can be used for diminishing the remaining vibration generated in the preceding cycle time Tc is only the inactive period Te and is the shortest. However, the inactive period Te is set at (0.5+m)×Ta, therefore an effect of the remaining vibration can be restricted as much as possible.

Further, a dot of the maximum tone is printed by seven ink droplets ejected successively in the subsequent cycle time Tc, therefore, even if ejection of a first ink droplet is affected by the remaining vibration, turbulence of an ink droplet ejected first can be compensated by ink droplets ejected at a second time and subsequent times. Therefore, even in this case, a dot of the maximum tone can be printed without being affected by the remaining vibration substantially.

As described above, in the second embodiment, the output times of the drive pulse signals for ejection of the first to the seventh ink droplets differ from each other, and the output timings of the final drive pulse signals for all the tones are not set at the same timing in each cycle time Tc. However, the inactive period Te is set at (0.5+m)×Ta, and the output timings of the initial drive pulse signals for tones other than the maximum tone can be delayed for time $Tr_1$ to $Tr_6$ from a start of each cycle time Tc. In addition, $Tr_1$ to $Tr_6$ are set at integral multiples of the pressure propagation time Ta. Therefore, the initial drive pulse signal of the subsequent cycle time Tc is output at a timing where an amplitude of the remaining vibration waveform becomes zero. Further, as the number of the subsequent ink droplets becomes large, that is, as it is the tone in which a larger dot is printed, an effect of the remaining vibration generated in the preceding cycle time Tc becomes smaller and is set to be shorter in an order of $Tr_1 > Tr_2 > \ldots > Tr_6$. For this reason, an effect of the remaining vibration that is generated in the preceding print cycle and deteriorates the print quality in the subsequent print cycle can be reduced without accompanying complexity of control and reduction in print speed.

In the first and the second embodiments described above, the description was made with respect to setting for outputting the drive pulse signals from the drive voltage generator 2 in the cycle time subsequent to the preceding cycle time in which a dot of the maximum tone is printed. However, this setting is also applied to a case where a dot of a tone other than the maximum tone is printed in the preceding cycle time with the maximum tone that maximizes the remaining vibration as a reference. However, as long as the setting described above is applied to a case where a dot of the maximum tone is printed in the preceding cycle time, the setting does not need to be applied to the case where a dot of a tone other than the maximum tone is printed in the preceding cycle time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A driving method of an inkjet head including a plurality of nozzles that eject one or more ink droplets to print a dot of a tone corresponding to the number of ink droplets, a plurality of pressure chambers that are communicated with said nozzles respectively, adjacent to each other, and separated by partitions, and a common pressure chamber that supplies ink to said pressure chambers, comprising:

providing a plurality of actuators for said pressure chambers that change volumes of said pressure chambers according to drive voltages; and applying a series of drive pulse signals for the number of ink droplets to be ejected as the drive voltage to each of said actuators in each cycle time Tc which is a print cycle of one dot, wherein the cycle time Tc, the number of ink droplets N for a maximum tone, output time $Td_k$ (where k=1, 2, 3, ... N) in which the drive pulse signal is applied for ejection of each ink droplet, and an inactive period Te in which said pressure chambers are made inactive from an end of application of a final drive pulse signal for the maximum tone to a start of the next cycle time Tc are set in a relationship of $Tc=(Td_1+Td_2+Td_3+ \ldots +Td_N)+Te$, the inactive period Te is set, by referencing pressure propagation time Ta of a pressure wave that propagates in each of said pressure chambers from said common pressure chamber to said nozzle, in a relationship of $Te=(0.5+m) \times Ta$ (where m (natural number)=1, 2, 3, ... ), time $Tr_k$ (where k=1, 2, 3 ... N) from a start of the next cycle time Tc to application of an initial drive pulse signal for a tone other than the maximum tone is set in a relationship of $Tr_k=n \times Ta$ (where n (natural number)=1, 2, 3, ... ), and further, a relationship of $Tr_1 > Tr_2 > Tr_3 \ldots > Tr_{N-1}$ is established.

2. A driving device of an inkjet head including a plurality of nozzles that eject one or more ink droplets to print a dot of a tone corresponding to the number of ink droplets, a plurality of pressure chambers that are communicated with said nozzles respectively, adjacent to each other, and separated by partitions, and a common pressure chamber that supplies ink to said pressure chambers, comprising:

a plurality of actuators that are provided for said pressure chambers and change volumes of said pressure chambers according to drive voltages; and a drive voltage generator that applies a series of drive pulse signals for the number of ink droplets to be ejected as the drive voltage to each of said actuators in each cycle time Tc which is a print cycle of one dot, wherein said drive voltage generator is configured to set the cycle time Tc, the number of ink droplets N for a maximum tone, output time $Td_k$ (where k=1, 2, 3, ... N) in which the drive pulse signal is applied for ejection of each ink droplet, and an inactive period Te in which said pressure chambers are made inactive from an end of application of a final drive pulse signal for the maximum tone to a start of the next cycle time Tc in a relationship of $Tc=(Td_1+Td_2+Td_3+ \ldots +Td_N)+Te$, set the inactive period Te, by referencing pressure propagation time Ta of a pressure wave that propagates in each of said pressure chambers from said common pressure chamber to said nozzle, in a relationship of $Te=(0.5+m) \times Ta$ (where m (natural number)=1, 2, 3, ... ), set time $Tr_k$ (where k=1, 2, 3 ... N) from a start of the next cycle time Tc to application of an initial drive pulse signal for a tone other than the maximum tone in a relationship of $Tr_k=n \times Ta$ (where n (natural number)=1, 2, 3, ... ), and further establish a relationship of $Tr_1 > Tr_2 > Tr_3 > \ldots > Tr_{N-1}$.

* * * * *